(12) United States Patent
Maguire

(10) Patent No.: US 10,597,513 B2
(45) Date of Patent: Mar. 24, 2020

(54) COTTONSEED OIL BASED ADDITIVE COMPOSITIONS FOR PLASTICS MOLDING AND EXTRUSION

(71) Applicant: Stephen B. Maguire, West Chester, PA (US)

(72) Inventor: Stephen B. Maguire, West Chester, PA (US)

( * ) Notice: Subject to any disclaimer, the term of this patent is extended or adjusted under 35 U.S.C. 154(b) by 0 days.

(21) Appl. No.: 15/886,137

(22) Filed: Feb. 1, 2018

(65) Prior Publication Data

US 2018/0155523 A1 Jun. 7, 2018

Related U.S. Application Data

(63) Continuation-in-part of application No. 15/883,501, filed on Jan. 30, 2018, which is a continuation-in-part of application No. 15/432,495, filed on Feb. 14, 2017, which is a continuation of application No. 14/333,579, filed on Jul. 17, 2014, now Pat. No. 9,708,462.

(60) Provisional application No. 61/847,119, filed on Jul. 17, 2013.

(51) Int. Cl.
| | |
|---|---|
| *C08K 5/09* | (2006.01) |
| *C08J 3/22* | (2006.01) |
| *C08K 5/00* | (2006.01) |
| *C08J 3/205* | (2006.01) |
| *B29C 48/06* | (2019.01) |
| *B29C 48/29* | (2019.01) |
| *B29C 48/94* | (2019.01) |
| *C08K 5/01* | (2006.01) |
| *C08K 5/103* | (2006.01) |
| *B29K 105/00* | (2006.01) |
| *B29C 45/00* | (2006.01) |

(52) U.S. Cl.
CPC ............... *C08K 5/09* (2013.01); *B29C 48/06* (2019.02); *B29C 48/29* (2019.02); *B29C 48/94* (2019.02); *C08J 3/2053* (2013.01); *C08J 3/226* (2013.01); *C08K 5/0041* (2013.01); *C08K 5/01* (2013.01); *C08K 5/103* (2013.01); *B29C 45/0013* (2013.01); *B29C 2948/92704* (2019.02); *B29K 2105/0011* (2013.01); *B29K 2105/0032* (2013.01); *C08J 2300/00* (2013.01); *C08J 2300/22* (2013.01); *C08J 2491/00* (2013.01)

(58) Field of Classification Search
CPC .............. B29C 45/001; B29C 47/1063; B29C 2035/043; B29C 2035/1633; B29C 66/00461; B29C 47/0016; B29C 47/94; C08K 3/013; C08K 5/09; C08K 5/0041; B29K 2101/12; B29K 2105/0032; C08J 3/2053; C08J 3/226
See application file for complete search history.

(56) References Cited

U.S. PATENT DOCUMENTS

| | | |
|---|---|---|
| 600,233 A | 3/1898 | Palm |
| 1,305,964 A | 6/1919 | Dickson |
| 1,451,759 A | 4/1923 | Bruhn |
| 1,482,376 A | 2/1924 | Anderson |
| 1,489,348 A | 4/1924 | Hampton |
| 1,707,977 A | 4/1929 | Davis |
| 2,188,646 A | 1/1940 | Bunch |
| 2,199,657 A | 5/1940 | Bunch |
| 2,387,233 A | 10/1945 | Clapp |
| 2,606,696 A | 8/1952 | Miner |
| 2,656,828 A | 10/1953 | Conover |
| 2,665,825 A | 1/1954 | Poitras et al. |
| 2,701,881 A | 2/1955 | McGee |
| 2,873,892 A | 2/1959 | Nelson et al. |
| 2,909,315 A | 10/1959 | Sampietro |
| 2,956,822 A | 10/1960 | Kates |
| 3,252,618 A | 5/1966 | Anderson |
| 3,297,049 A | 1/1967 | Moscovitz |
| 3,391,645 A | 7/1968 | Koza |
| 3,468,904 A | 9/1969 | Kritchevsky |
| 3,471,178 A | 10/1969 | Roe |
| 3,477,698 A | 11/1969 | Smith et al. |
| 3,481,509 A | 12/1969 | Marhauer |
| 3,488,204 A | 1/1970 | Hardy |
| 3,518,033 A | 6/1970 | Anderson |
| 3,785,412 A | 1/1974 | Stone |
| 3,814,388 A | 6/1974 | Jakob |

(Continued)

FOREIGN PATENT DOCUMENTS

| | | |
|---|---|---|
| CA | 2643213 A1 | 8/2007 |
| CN | 2809263 Y | 8/2006 |

(Continued)

OTHER PUBLICATIONS

Forty-four page two-sided brochure including cover and back pages entitled "Maguire: Auxiliary equipment for the plastics industry" of Maguire Products Inc. Oct. 2000.

(Continued)

*Primary Examiner* — Stella K Yi

(74) *Attorney, Agent, or Firm* — Fox Rothschild LLP

(57) ABSTRACT

A method of fabricating plastic products having a preselected characteristic, comprising preparing a dispersion of at least one additive contributes the preselected characteristic in cottonseed oil; supplying a preselected plastic resin for the product to be fabricated to a process machine having a rotating screw; furnishing the dispersion to the process machine at a position adjacent to threaded portion of the rotating screw; and blending the dispersion and the resin by rotating the screw.

11 Claims, No Drawings

(56) References Cited

U.S. PATENT DOCUMENTS

| | | |
|---|---|---|
| 3,820,828 A | 6/1974 | Fiddler |
| 3,883,275 A | 5/1975 | Browne |
| 3,953,218 A | 4/1976 | Pollard |
| 3,957,399 A | 5/1976 | Siczek |
| 3,960,393 A | 6/1976 | Hosokawa |
| 3,988,088 A | 10/1976 | King et al. |
| 3,998,103 A | 12/1976 | Bjorklund et al. |
| 4,046,495 A | 9/1977 | Grimm, Jr. |
| 4,124,042 A | 11/1978 | Foulkes |
| 4,185,948 A | 1/1980 | Maguire |
| 4,211,345 A | 7/1980 | Taubenmann |
| 4,251,796 A | 2/1981 | Soeda |
| 4,377,291 A | 3/1983 | Albertini |
| 4,382,618 A | 5/1983 | Grisebach |
| 4,469,127 A | 9/1984 | Kitamura |
| 4,473,173 A | 9/1984 | DeGroff et al. |
| 4,479,107 A | 10/1984 | Bleeke |
| 4,501,405 A | 2/1985 | Usry |
| 4,571,416 A | 1/1986 | Jarzombeck et al. |
| 4,580,721 A | 4/1986 | Coffee |
| 4,586,882 A | 5/1986 | Tseng |
| 4,605,297 A | 8/1986 | Livingston et al. |
| 4,606,710 A | 8/1986 | Maguire |
| 4,621,990 A | 11/1986 | Forsythe et al. |
| 4,657,490 A | 4/1987 | Abbott |
| 4,759,189 A | 7/1988 | Stropkay |
| 4,796,782 A | 1/1989 | Wales |
| 4,815,042 A | 3/1989 | Pratt |
| 4,834,071 A | 5/1989 | Hosoi et al. |
| 4,921,132 A | 5/1990 | Wales |
| 4,967,940 A | 11/1990 | Blette et al. |
| 5,039,279 A | 8/1991 | Natwick et al. |
| 5,116,547 A | 5/1992 | Tsukahara et al. |
| 5,183,075 A | 2/1993 | Stein |
| 5,187,993 A | 2/1993 | Nicholson et al. |
| 5,199,852 A | 4/1993 | Danby |
| 5,215,215 A | 6/1993 | Sauer |
| 5,225,210 A | 7/1993 | Shimoda |
| 5,257,914 A | 11/1993 | Reynolds |
| 5,318,431 A | 6/1994 | Chang |
| 5,344,232 A | 9/1994 | Nelson et al. |
| 5,364,242 A | 11/1994 | Olsen |
| 5,402,670 A | 4/1995 | Wicnienski |
| 5,404,904 A | 4/1995 | Glaser |
| 5,423,455 A | 6/1995 | Ricciardi |
| 5,580,503 A | 12/1996 | Hall, III |
| 5,609,191 A | 3/1997 | Topping |
| 5,622,392 A | 4/1997 | Gochenouer |
| 5,723,517 A | 3/1998 | Campo |
| 5,853,244 A | 12/1998 | Hoff et al. |
| 5,911,339 A | 6/1999 | Peterson |
| 5,953,923 A | 9/1999 | Davies |
| 5,980,490 A | 11/1999 | Tsoukalis |
| 5,984,777 A | 11/1999 | Kuchar |
| 5,988,983 A | 11/1999 | Furusawa |
| 6,007,236 A | 12/1999 | Maguire |
| 6,057,514 A | 5/2000 | Maguire |
| 6,188,936 B1 | 2/2001 | Maguire et al. |
| 6,213,739 B1 | 4/2001 | Phallen et al. |
| 6,287,491 B1 | 9/2001 | Kilim et al. |
| 6,386,841 B1 | 5/2002 | Probst |
| 6,402,363 B1 | 6/2002 | Maguire |
| 6,402,865 B1 | 6/2002 | Handa et al. |
| 6,502,013 B1 | 12/2002 | Sosnik |
| 6,523,451 B1 | 2/2003 | Liao |
| 6,599,005 B2 | 7/2003 | van Der Wei |
| 6,669,358 B2 | 12/2003 | Shimoda |
| 6,719,453 B2 | 4/2004 | Cosman et al. |
| 6,732,629 B1 | 5/2004 | Miller et al. |
| 6,840,744 B2 | 1/2005 | Watling |
| 6,853,100 B2 | 2/2005 | Yumita |
| 6,879,876 B2 | 4/2005 | O'Dougherty et al. |
| 6,880,965 B1 | 4/2005 | Sheffield, Jr. |
| 6,991,004 B2 | 1/2006 | Kaufhold et al. |
| 7,118,349 B2 | 10/2006 | Oglesby |
| 7,154,069 B1 | 12/2006 | Gordon |
| 7,201,290 B2 | 4/2007 | Mehus |
| 7,264,161 B2 | 9/2007 | Polarine |
| 7,311,882 B1 | 12/2007 | Renzi |
| 7,390,119 B2 | 6/2008 | Maguire |
| 7,416,096 B2 | 8/2008 | Maguire |
| 7,526,911 B2 | 5/2009 | Pickard et al. |
| 7,594,717 B2 | 9/2009 | Sheinman |
| 7,958,915 B2 | 6/2011 | Maguire |
| 7,980,834 B2 | 7/2011 | Maguire |
| 8,042,578 B2 | 10/2011 | Post |
| 8,230,877 B2 | 7/2012 | Roberge et al. |
| 8,627,852 B2 | 1/2014 | Hatton |
| 8,757,217 B2 | 6/2014 | Maguire |
| 8,800,821 B2 | 8/2014 | Maguire et al. |
| 8,844,584 B1 | 9/2014 | Haley |
| 9,188,118 B2 | 11/2015 | Maguire |
| 9,599,265 B2 | 3/2017 | Maguire |
| 9,637,283 B2 | 5/2017 | Maguire |
| 2002/0023449 A1 | 2/2002 | Park et al. |
| 2002/0031822 A1 | 3/2002 | Van Der Wei et al. |
| 2002/0036950 A1* | 3/2002 | Cosman ............... B01F 13/1055 366/152.1 |
| 2002/0122103 A1 | 9/2002 | Yamamoto et al. |
| 2002/0189667 A1 | 12/2002 | O'Dougherty et al. |
| 2003/0051767 A1 | 3/2003 | Coccaro |
| 2003/0071868 A1 | 4/2003 | Koshikawa et al. |
| 2003/0095468 A1 | 5/2003 | Shimoda |
| 2003/0142580 A1 | 7/2003 | Maguire |
| 2003/0218014 A1 | 11/2003 | Gregory et al. |
| 2004/0020723 A1 | 2/2004 | Schuman |
| 2005/0052945 A1 | 3/2005 | Maguire |
| 2005/0126638 A1 | 6/2005 | Gilbert |
| 2006/0067844 A1 | 3/2006 | Iversen |
| 2006/0151051 A1 | 7/2006 | Py |
| 2006/0169718 A1 | 8/2006 | Buining |
| 2007/0071624 A1 | 3/2007 | Brewer |
| 2007/0292288 A1 | 12/2007 | Maguire |
| 2008/0267002 A1 | 10/2008 | Rannasmaa |
| 2010/0276033 A1 | 11/2010 | Asp et al. |
| 2010/0322644 A1 | 12/2010 | Ajima |
| 2011/0200464 A1 | 8/2011 | Maguire et al. |
| 2012/0189762 A1 | 7/2012 | Reineccius |
| 2012/0195771 A1 | 8/2012 | Brender a Brandis |
| 2012/0260992 A1 | 10/2012 | Maguire |
| 2013/0334258 A1 | 12/2013 | Maguire |
| 2014/0087035 A1 | 3/2014 | Cummings |
| 2014/0147288 A1 | 5/2014 | Maguire |
| 2014/0224830 A1 | 8/2014 | Maguire |
| 2014/0348667 A1 | 11/2014 | McCourt et al. |
| 2015/0020713 A1 | 1/2015 | Maguire |
| 2015/0066794 A1 | 3/2015 | Maguire et al. |
| 2015/0108748 A1 | 4/2015 | Maguire |
| 2015/0165662 A1 | 6/2015 | Maguire |
| 2016/0040661 A1 | 2/2016 | Maguire |
| 2017/0001354 A1 | 1/2017 | Nobuta et al. |

FOREIGN PATENT DOCUMENTS

| | | |
|---|---|---|
| DE | 3433693 A1 | 3/1986 |
| DE | 40 23 933 A1 | 1/1991 |
| EP | 1400332 A1 | 3/2004 |
| FR | 1 477 595 A | 4/1967 |
| FR | 2 273 648 A1 | 1/1976 |
| GB | 1145752 | 3/1969 |
| JP | 3550699 B2 | 8/2004 |
| JP | 2013-018283 A | 1/2013 |
| KR | 10-2011-0100596 A | 9/2011 |
| WO | WO 01/49374 A1 | 7/2001 |
| WO | WO 2015/089499 | 6/2015 |

OTHER PUBLICATIONS

Two-sided color brochure entitled Maguire: Model MPA Liquid Color Pump Maguire Products Inc. published Dec. 28, 1995.

International Search Report for PCT/US02/02934 dated Feb. 20, 2003.

Written Opinion for PCT/US02/02934 dated Mar. 24, 2003.

(56) References Cited

OTHER PUBLICATIONS

International Search Report for PCT/US11/021994 dated May 24, 2011.
Written Opinion for PCT/US11/021994 dated May 24, 2011.
Thirty-two page catalog entitled "Maguire Color Blending Equipment" published by Maguire Products Inc. 1993 United States.
International Search Report for PCT/US2014/070284 dated Apr. 15, 2015.
Written Opinion for PCT/US2014/070284 dated Apr. 15, 2015.
International Search Report for PCT/US2014/053391 dated Jan. 29, 2015.
Written Opinion for PCT/US2014/053391 dated Jan. 29, 2015.
Wayback Machine of SMC Linear Actuators Sep. 11, 2011 SMC Accessed on Apr. 6, 2016.
Wayback Machine of SMC Linear Actuator C02 Series Catalog Sep. 11, 2011 SMC Accessed on Apr. 6, 2016.
Extended European Search Report and Written Opinion for European Patent Application No. 14870414.1, dated Sep. 12, 2017.
European Search Report and Written Opinion for European Patent Application No. 14840183.9, dated Apr. 24, 2017.
International Search Report and Written Opinion for PCT/US2018/025069; dated Jul. 17, 2018.
Dec. 31, 2018 Non-Final Office Action against Applicant's co-pending U.S. Appl. No. 15/420,762.
Jan. 25, 2019 Final Office Action against Applicant's co-pending U.S. Appl. No. 15/581,960.
Mar. 6, 2019 Final Office Action against Applicant's co-pending U.S. Appl. No. 15/298,802.
Mar. 8, 2019 Final Office Action against Applicant's co-pending U.S. Appl. No. 14/700,911.

\* cited by examiner

COTTONSEED OIL BASED ADDITIVE COMPOSITIONS FOR PLASTICS MOLDING AND EXTRUSION

CROSS-REFERENCE TO RELATED PATENT APPLICATIONS

This patent application is a 35 USC 120 continuation-in-part application claiming the benefit of the priority of co-pending parent patent application U.S. Ser. No. 15/883,501, filed 30 Jan. 2018 in the name of Stephen B. Maguire and entitled "Cottonseed Oil Based Liquid Color Composition and Plastics Coloring Method Using the Same."

The '501 patent application is a 35 USC 120 continuation-in-part application, claiming the benefit of the priority of parent patent application U.S. Ser. No. 15/432,495, now published as United States patent publication US 2017-0152366 A1, filed 14 Feb. 2017 in the name of Stephen B. Maguire and entitled "Cottonseed Oil Based Liquid Color Composition and Plastics Coloring Method Using the Same." This patent application, through the co-pending '495 and '501 applications and the parent of the '495 application, namely U.S. patent application Ser. No. 14/333,579 filed 17 Jul. 2014 in the name of Stephen B. Maguire and entitled "Liquid Color Composition with Cottonseed Oil Base," published 22 Jan. 2015 as United Stated patent publication 2015/0020713 A1, and issued as U.S. Pat. No. 9,708,462 on 18 Jul. 2017, claims the benefit of the priority under 35 USC 120 of the '579 application (now the '462 patent) and the benefit of the priority of U.S. provisional patent application Ser. No. 61/847,119 entitled "Liquid Color Composition with Cottonseed Oil Base" filed 17 Jul. 2013 in the name of Stephen B. Maguire.

STATEMENT REGARDING FEDERAL FINANCING RESPECTING THIS INVENTION

Not applicable.

INCORPORATION BY REFERENCE

Applicant hereby incorporates by reference the disclosures of U.S. Pat. Nos. 3,468,904 A and 3,488,204 A as well as U.S. Pat. Nos. 4,921,132 A, 7,201,290 B2, 8,042,578 B2, 8,627,852 B2, 8,757,217 B2, 9,188,118 B2, 9,708,462 B2 and United States patent publications U.S. 2002/0122103 A1, 2002/0189667 A1, 2003/0071868 A1, U.S. 2005/0126638 A1, U.S. 2010/0322644 A1, U.S. 2010/0322644 A1, U.S. 2016/0040661 A1 and U.S. 2017/0152366 A1.

BACKGROUND OF THE INVENTION

Field of the Invention

This invention involves use of cottonseed oil as the primary ingredient or a secondary ingredient of a liquid carrier for additives used when manufacturing in the plastics industry. As used herein the term "process machine" embraces extruders and injection molding presses used to manufacture finished and semi-finished plastic parts.

DESCRIPTION OF THE INVENTION

The liquid carrier for an additive must be compatible with the plastic resin to which it is to be added. Different resins may require different carriers. When selecting a liquid carrier, certain characteristics are desirable while other characteristics must be avoided.

Surfactants, or "soap-like" carriers, can cause "slip" during the molding or extrusion process, which must be avoided.

The liquid carrier must not break down at the high temperatures required in the molding or extrusion process that melt the plastic resin.

Carrier liquid that imparts an odor to the final part cannot be used when molding or extruding products to be used to contain food, such as plastic water bottles.

Cost and availability of the carrier liquid are always factors.

Heretofore, no single liquid carrier solves all these problems. However this invention is based on the discovery that cottonseed oil is superior to other carriers in meeting a number of these requirements and solving many of the aforementioned problems. Cottonseed oil is not known to have previously been used as a carrier for additive used in plastics molding or extrusion.

Cottonseed oil has a relatively high flash point, and a high smoke point, well above 400° F. Most other liquid carriers smoke below 400° F.

Cottonseed oil has very little odor. Cottonseed oil is known to be used as a cooking oil that does not impart flavor to the food being cooked. This is a benefit when molding or extruding plastic products used for food packaging.

Cottonseed oil is high in antioxidants, providing an advantage in preserving products packaged in plastic that has been molded or extruded using a cottonseed oil carrier for the additives of interest.

Cottonseed oil is high in vitamin "E", an antioxidant, which is often required as an additive when using other carriers.

Cottonseed oil is available in bulk qualities, and is competitively priced.

In one of its aspects, this invention provides a method of fabricating a plastic article where the method includes preparing a blend, where the blend preferably comprises solid plastic resin pellets, and a liquid carrier for one or more selected additives, and the one or more selected additives where the liquid carrier preferably includes or is even pure cottonseed oil, and thereafter forming the blend preferably under pressure and heat into the plastic article. The method may preferably be accomplished either by injection molding or by extrusion. In practice of this aspect of the invention, the additive may comprise at least one dispersion of a single additive in cottonseed oil either alone or with other selected additives.

The method may further include the liquid blend preferably comprising at least one additive to facilitate fabrication of the plastic article, where the additive may be selected from the group preferably comprising lubricants, blowing agents, light stabilizers, nucleating agents, antistatic agents and antioxidants.

In still another aspect, this invention provides a liquid carrier for use in molding or extruding plastic products where the carrier preferably includes cottonseed oil and at least one additive, with the additive desirably being preferably dispersed in the cottonseed oil. Pigment may optionally be included as one of the additives; the pigment may be a solid colorant, a liquid, or a pigment dispersion, preferably in a cottonseed oil base. In this aspect of the invention, the additive may preferably be one or more lubricants, blowing agents, light stabilizers, nucleating agents, antistatic agents, and/or antioxidants, and/or pigment or dispersions of pigment In one preferred practice of this invention, an additive dispersion is prepared initially by dispersing a selected additive in cottonseed oil to create a liquid blend. The additive is preferably initially introduced into a vat of cottonseed oil, which acts as a liquid carrier. The additive is preferably mixed into the cottonseed oil. The additive is added to the cottonseed oil in the known correct proportion. Typically the batch of additives added to the cottonseed oil is as little as 0.1% by weight of the resulting blend; the upper limit of the range depends on the particular additive selected.

Next the blend dispersion of the additive in the cottonseed oil may be milled if the additive is in solid phase by passing the blend through a mill serving to break down any agglomerates of additive that may remain in the blend, thereby reducing particle size of any solid additive to as small a size as possible. Any resulting particles of a solid additive are very, very small. Milling the blend allows use of less additive to perform the particular molding or extrusion function, thereby reducing costs. The milling may be done using a roller mill or a sand mill.

Use of cottonseed oil as the carrier for the single additive or the blend of additives results in a carrier blend that is compatible with nearly all resins currently used in plastic molding and extrusion. The cottonseed oil-based blend does not leach out of finished products, nor does the cottonseed oil by itself leach out of finished products. Cottonseed oil has been found to hold solid additive particles in suspension very well and accepts a high loading of same.

Additive-cottonseed oil carrier blends in accordance with the invention may be used to fabricate most commercially used thermoplastics, whether fabricated by means of extrusion, injection molding or blow molding, as well as thermoplastics that are fabricated using less conventional processes. When properly formulated, the additive-cottonseed oil blend according to the invention is compatible not just with a base resin, but frequently improves the fabricating process and/or the performance properties of the fabricated plastic parts.

The range of thermopolymers with which the cottonseed oil and additive dispersion blends of the invention may be used is quite broad and includes acrylic, nylon, acrylonitrile butadiene styrene, polycarbonate, polybenzimidazole, polyether sulfone, polyetherether keytone, polyethermide, polyethylene, polypropylene, polythenylene sulfide, polyphenylene oxide, polystyrene, polyvinyl chloride, polytetrafluoroethylene, as well as others.

Additive according to this invention may be formulated in various ways to provide various advantageous product characteristics. For example, commodity additives may be formulated in accordance with the invention to maximize savings without sacrificing processability and cosmetic appearance of the final plastic parts. Such commodity additives offer the processor economies and are suitable for mass manufacture of volume parts such as housewares, disposable goods, toys and the like.

The invention also has applicability to providing additive blends in cottonseed oil carriers for use in fabricating articles designed for outdoor use, specifically for lawn and garden applications, for the toy and recreation industries. The additives in accordance with the invention may be formulated to meet very stringent requirements of heat stability and color fastness of the resulting fabricated color parts. Such parts may be used in applications requiring extended exposure to sunlight and/or unusually high temperatures during the fabrication process.

The additives according to the invention may be produced to provide special effects such as fluorescent, phosphorescent, pearlescent, and non-dispersing finishes, where such unconventional appearances are dictated by the design of the parts.

In another aspect of the invention, one may make additive blends, including liquid color for example, for use in the course of molding or extruding plastic parts by initially providing a collection of such additives. Next, one selects a formula for the additive(s) and liquid carrier, preferably cottonseed oil that will provide the desired characteristic(s) for the plastic parts being molded or extruded. Selecting the formula may be a "trial and error" process, in that slight changes may require changes in the additive constituency, thereby requiring experimentation as to the exact formula of additive(s) required to produce the required characteristic in the finished or semi-finished molded or extruded plastic product hue.

Once the formula has been established for the amount of additive(s) and the amount of the preferable cottonseed oil liquid carrier, the additives are selected in amounts required in the formula. A liquid carrier, preferably cottonseed oil, is provided in an amount according to the formula and the selected additives are then blended, preferably but not necessarily all at once, into the cottonseed oil to produce the desired blend. Such additives can be milled if necessary. This method of the invention avoids the two-step process of making single additive dispersions, milling single additive dispersions individually, and then combining the single additive dispersions to produce the required additive blend.

The processing of thermoplastic resin and/or the performance of the fabricated plastic parts can often be greatly enhanced through use of such additives. Many commercial resins already include additives. However, significant benefits can be derived from further modification of such compounds in many cases. Moreover, use of additives affords a plastics processor the opportunity to tailor the plastic resin material to a specific application.

Some processing aid-type additives improve productivity of the molding or extrusion machinery through reduction of internal friction; these additives are referred to as "lubricants." Other processing aid-type additives change polymer morphology and are referred to as "nucleating agents." Still other processing aid-type additives remove excessive heat and are in the form of endothermic blowing agents. Yet additional processing aid-type additives suppress thermal decomposition during processing and are generally referred to as "antioxidants." Still yet additional additives may effectuate a more rapid physical or chemical breakdown of the finished polymeric product, perhaps in regard to exposure to ultraviolet light or other environmental factors, accelerating physical or chemical breakdown of the fabricated plastic part thereby enhancing the environmental acceptability of the part.

Other additives, such as blowing agents and optical brighteners, enhance aesthetics and/or performance properties of the final parts by, for example, providing antistatic properties or ultraviolent light stabilization characteristics to the finished or semi-finished plastic product.

Modification of properties of thermopolymers through the addition of various chemical additives is economically preferable to the introduction of an entirely new resin. The most economical way to add these additives to the molding or extrusion process is in the course of the performance of the process.

Some suitable additives that are within the scope of the invention are discussed below:

Glide Slip Agents: Plastic processing often needs a slip agent to assist in polymer flow and provide internal and external slip characteristics. Friction characteristics, when processing polymers, require slip/lubricants in order to improve cycle times, improve dispersion, assist mold release and improve assembly of molded parts. The amount of slip depends on the process and end use requirements. Consumer packaging requirements often need slip for the finished product, but the plastic processor may also need it to improve processing and plastic parts assembly.

Shield Liquid Light Stabilizer Agents: Liquid light stabilizers are effective in a broad range of plastics and can help achieve long-term sustainability goals as in the recycling of plastics, including products formulated with hindered amines (HALS) and UV absorbers. For certain applications, blends of these two products provide improved performance. Ultraviolet (UV) radiation from the sun needs the combination of HALS and antioxidants for long-term stability. Polymer photo-oxidation is a combined action of light and oxygen. The visible result of this action is deterioration of the appearance of the polymer as well as mechanical and chemical concerns. Additive products can protect against these conditions. UV absorbers protect the contents of plastics packaging from ultraviolet rays up to 390 nm.

Speed Nucleating Agents: Liquid nucleating agents improve the physical properties of semi-crystalline polyolefins. This results in fast crystallization rates, which allow for improved cycle times and better production capacity along with quality. When the clarifying agent is added to polypropylene, the size of crystalline structures of the polymer reduces, to improve the stiffness and clarity. Additionally, when added to the process, the rate of crystal initiation is increased dramatically so the crystals become smaller in size thereby clarifying the polypropylene. These aspects of the invention meet the needs of a well-nucleated product by offering a combination of high crystalline temperature in the polymer with the most isotropic (uniform) shrinkage in the finished product.

Guard Antioxidant Agents: Heat is a necessary function for molding plastics. However, under higher than normal processing temperatures, it may be necessary to add an additional stabilizer to maintain the integrity of the polymer. Degradation of polymers, due to excessive heat, can have an effect on the process, product stability and screw barrel contamination. Another factor of concern is the increased use of PCR. Antioxidant additions to the combinations of virgin and PCR resins can provide the heat stability needed to maintain a healthy polymer. Solutions range from a single functional antioxidant, for processing with higher heat conditions, to multifunctional products that improve heat stability as well as long-term heat aging.

Foam Liquid Blowing Agents: Foaming agents have been used to reduce the densities of molded and extruded thermoplastics. Today, this need is receiving more attention because of the desire to make plastics more sustainable. This can be accomplished by reducing the amount of plastic needed to make a finished product. By reducing the density, one reduces the amount of plastic used to make molded parts and extruded products, thereby reducing the carbon footprint. Liquid foaming agents can be metered precisely into the melt flow to achieve the desired level of density reduction and are produced without a heat history eliminating pre-decomposition concerns. The selection of endothermic agents, exothermic agents, or a combination of both is within the scope of the invention. Processing with liquid endothermic foaming agents also reduces energy required for the process.

Clean Antimicrobial Agents: These are inorganic silver based antimicrobials, which inhibit the growth of gram-positive/gram-negative bacteria, mold and yeast. Untreated plastic products run the risk of microbial growth causing unsightly discoloration, staining, and unpleasant odors, as well as deterioration and corrosion of manufactured products.

Rain Flow Modifiers: There are many situations in plastics processing where a slight change in resin dispersion and flow characteristics benefits the process as well as the product. Additives that, when metered at low letdowns, solve processing problems such as poor dispersion, black specks, easier flow properties, better mold release, improved surface characteristics, reduction in sheer stress along with heating, and provide an overall reduction in energy consumption. The raw materials used in practicing the invention have a history of performing well in plastics.

This invention may be embodied in other specific forms without departing from the spirit or essential characteristics of the invention. The disclosed embodiments are therefore to be considered in all respects as being illustrative and not restrictive with the scope of the invention being indicated by the appended claims rather than by the foregoing description. All changes which come within the meaning and range of equivalency of the claims are therefore intended to be embraced therein.

As discussed above and from the foregoing description of the exemplary embodiments of the invention, it will be readily apparent to those skilled in the art to which the invention pertains that the principles and particularly the composition and methods disclosed herein can be used for applications other than those specifically mentioned. All such applications of the invention are intended to be covered by the appended claims unless expressly excluded therefrom.

As used in the claims below, "comprising" means "including" while "consisting of" means "having only", and "consisting essentially of" means having the stated constituents plus trivial amounts of other reagents which do not materially affect the claimed invention or products embodying the same.

The scope of the invention is, therefore, indicated by the appended claims rather than by the foregoing description and all changes which come within the range of equivalency of the claims are to be considered to be embraced within the scope of the claims. Additional objects, other advantages, and further novel features of the invention will become apparent from study of the appended claims as well as from study of the foregoing detailed discussion and description of the preferred embodiments of the invention, as that study proceeds.

I claim:

1. A method of molding or extruding plastic parts comprising the steps of:
   a) providing a collection of additives, at least one of which is a solid;
   b) providing a quantity of pure cottonseed oil;
   c) creating a plurality of single additive dispersions each in a cottonseed oil carrier;
   d) mixing selected ones of the single additive dispersions to create a blend;
   e) milling the blend while the cottonseed oil is in a liquid phase; and f) adding the blend to thermoplastic resin in the course of molding or extrusion.

2. A method of making a liquid additive blend for use in the course of molding or extruding plastic parts comprising the steps of:
   a) providing a collection of additives, at least one of which is a solid;
   b) providing a quantity of pure cottonseed oil;
   c) creating a plurality of solid additive dispersions from the collected additives, each in a cottonseed oil carrier;
   d) mixing selected ones of the solid additive dispersions with cottonseed oil to create a blend; and
   e) milling the blend while the cottonseed oil is in a liquid phase.

3. The method of claim 2 further comprising adding at least one additive selected from the group comprising lubricants, blowing agents, light stabilizers, nucleating agents, antistatic agents and antioxidants, to the blend.

4. The method of claim 2 wherein the selected dispersions are blended into the cottonseed oil simultaneously.

5. A method of fabricating plastic products having preselected characteristics, comprising:
   a) preparing a dispersion of additives, providing the preselected characteristics, in pure cottonseed oil;
   b) supplying a preselected plastic resin for the product to be fabricated to a process machine having a rotating screw;
   c) furnishing the dispersion to the process machine at a position adjacent to a threaded portion of the rotating screw while the cottonseed oil is in a liquid phase; and
   d) blending the dispersion and the resin by rotating the screw while the cottonseed oil is in the liquid phase.

6. The method of claim 2 wherein milling is performed using a roller mill.

7. The method of claim 2 wherein milling is performed using a sand mill.

8. A method of fabricating plastic products having preselected characteristics, consisting of:
   a. preparing a dispersion of additives, providing the preselected characteristics, in pure cottonseed oil;
   b. supplying a preselected plastic resin for the product to be fabricated to a process machine having a rotating screw;
   c. furnishing the dispersion to the process machine at a position adjacent to a threaded portion of the rotating screw while the cottonseed oil is in a liquid phase;
   and d. blending the dispersion and the resin by rotating the screw while the cottonseed oil is in the liquid phase.

9. A method of making a liquid additive blend for use in the course of molding or extruding plastic parts consisting essentially of the steps of:
   a. providing a collection of additives, at least one of which is a solid;
   b. providing a quantity of pure cottonseed oil;
   c. creating a plurality of solid additive dispersions from the collected additives, each in a cottonseed oil carrier;
   d. mixing selected ones of the solid additive dispersions with cottonseed oil to create a blend; and
   e. milling the blend while the cottonseed oil is in a liquid phase.

10. The method of claim 9 further comprising adding at least one additive selected from the group comprising lubricants, blowing agents, light stabilizers, nucleating agents, antistatic agents and antioxidants, to the blend.

11. The method of claim 9 wherein the selected dispersions are blended into the cottonseed oil simultaneously.

* * * * *